(12) United States Patent
Aalmink

(10) Patent No.: US 8,032,494 B2
(45) Date of Patent: Oct. 4, 2011

(54) ARCHIVING ENGINE

(75) Inventor: Jan Aalmink, Kronau (DE)

(73) Assignee: SAP AG, Walldorf (DE)

( * ) Notice: Subject to any disclaimer, the term of this patent is extended or adjusted under 35 U.S.C. 154(b) by 311 days.

(21) Appl. No.: 11/067,051

(22) Filed: Feb. 25, 2005

(65) Prior Publication Data

US 2006/0149796 A1 Jul. 6, 2006

(51) Int. Cl.
*G06F 7/00* (2006.01)
(52) U.S. Cl. ...................................... 707/666
(58) Field of Classification Search .................. 707/640, 707/644, 646, 649, 661, 662, 663, 665, 666
See application file for complete search history.

(56) References Cited

U.S. PATENT DOCUMENTS

| | | | |
|---|---|---|---|
| 6,490,597 B1 * | 12/2002 | Singh et al. .................. | 707/204 |
| 6,928,442 B2 * | 8/2005 | Farber et al. .................. | 707/10 |
| 2004/0167943 A1 * | 8/2004 | Margolus ...................... | 707/204 |

FOREIGN PATENT DOCUMENTS

| | | |
|---|---|---|
| EP | 1 324 215 A1 | 7/2003 |
| EP | 1 324 221 A2 | 7/2003 |
| EP | 1 324 221 A3 | 12/2003 |

* cited by examiner

*Primary Examiner* — John R. Cottingham
*Assistant Examiner* — Nirav Khakhar
(74) *Attorney, Agent, or Firm* — Kenyon & Kenyon LLP

(57) ABSTRACT

The present invention provides a system and method for archiving data that reduces the time needed for archiving by performing one or more preliminary comparisons of administrative data to preset criteria. Exemplary administrative data may include a resubmission date of a data element that is determined by processing of a rule set and stored with the data element so that it can be used for archiving. The first step of the archiving process may be to compare the resubmission date to the current date. If the resubmission date is less than or equal to the current date, the archiving process continues. Otherwise, the archiving process does not proceed and the application database continues to maintain the data element. Because the resubmission date is stored with the data element to be archived, the data element need only be retrieved from the database to perform the initial check. Only data elements having a administrative data that meet the initial criteria are processed to determine if they should be archived. This provides an efficient archiving process that reduces the overall time needed to archive a database freeing up computer resources for other purposes.

19 Claims, 4 Drawing Sheets

ARCHIVING ENGINE

BACKGROUND

Businesses often rely on data that is stored using computer technology. For example, computers often store data in databases, which are sets of files that can store digital data. Database administrators manage databases to ensure that data is correctly added, deleted or modified. The time and effort required to administer a database depends on its size. Database size may also affect the performance of retrieving data from a database. Freeing the database of "old" data may reduce the administrative burden and improve the performance of the database. "Old data" may include data that has been stored or has not been used for a specified period of time. Old data may also include data belonging to closed business transactions that is no longer needed for day-to-day operations.

Simply deleting such data from the database is often not feasible since it may still be needed due to legal or business requirements. Instead this data may be "archived" by copying it to archive files and then deleting it from the database. Archiving allows the database to remain manageable and the archived data can still be accessed if the need arises. Additionally, archiving allows for faster backup and recovery and more efficient use of resources.

For businesses that store large amounts of data, archiving can be a lengthy process. Since businesses want to use their computing systems for day-to-day business transactions, it is desirable to run archiving processes as quickly and efficiently as possible. However, archiving programs must process many data elements to identify old data that requires archiving. A two-step process may be used that involves first archiving data by performing some preprocessing and then deleting data from the database after performing the full checks required. Since a primary benefit of archiving is to relieve databases of old data, this two-step process may still require significant time for archiving.

DETAILED DESCRIPTION

The present invention provides a system and method for archiving data that reduces the time needed for archiving by performing one or more preliminary comparisons of administrative data to preset criteria. Exemplary administrative data may include a resubmission date of a data element that is determined by processing of a rule set and stored with the data element so that it can be used for archiving. The first step of the archiving process may be to compare the resubmission date to the current date. If the resubmission date is less than or equal to the current date, the archiving process continues. Otherwise, the archiving process does not proceed and the application database continues to maintain the data element. Because the resubmission date is stored with the data element to be archived, the data element need only be retrieved from the database to perform the initial check. Only data elements having a administrative data that meet the initial criteria are processed to determine if they should be archived. This provides an efficient archiving process that reduces the overall time needed to archive a database freeing up computer resources for other purposes.

Figure 1:
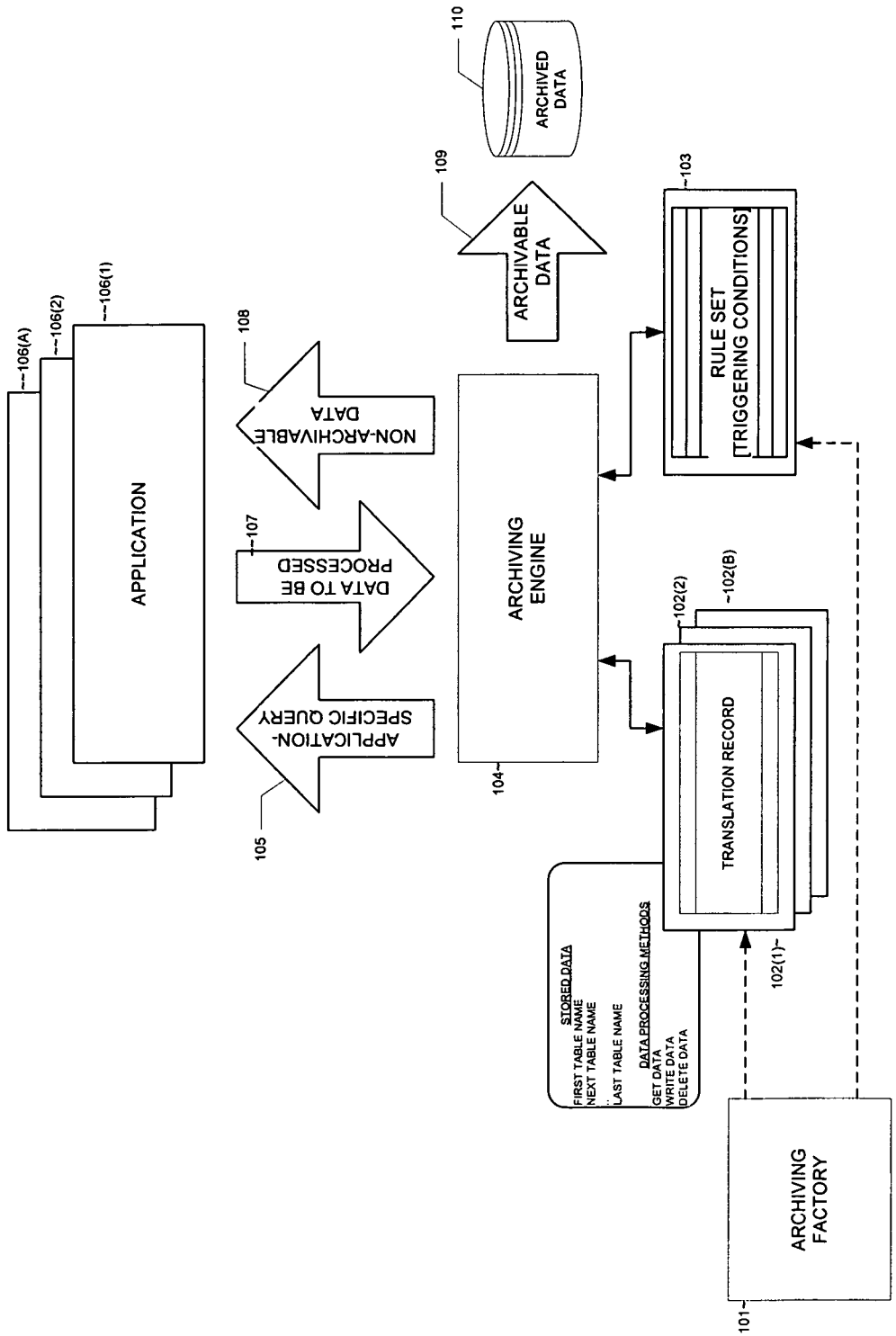
FIG. 1 illustrates an archiving data flow environment according to one embodiment of the invention.

FIG. 1 illustrates an archiving data flow diagram according to one embodiment of the invention. Archiving data sets aside or backs-up data for later retention. Application-independent processes may be generated by an archiving factory 101. To archive data, an archiving engine 104 may run these application-independent processes to archive the data of multiple applications 106(1)-106(A). An application 106 may be software that performs one or more specific functions for customers, such as a customer sales application that provides marketing planning, campaign management, customer segmentation, other marketing analysis, sales planning and forecasting, sales organizational and territory management, account and contact management or other sales support or analysis. To archive data, the archiving engine 104 may store archived data 110 in a machine-readable medium (transient or persistent) that is external to the application 106. The archived data 110 may be stored as business objects, in files and/or as another collection of digital data. Business objects may be of various types, depending on the business application that generates the data. Exemplary types of business objects includes sales and account management business object types.

The archiving factory 101 may generate a rule set 103. The rule set 103 may include conditions that when met trigger the archiving of data. Exemplary conditions include the type of business and product that the data is associated with, as well as flags that may be set to identify certain data. For example, if the data being processed 107 was generated by a sales department that was taking an order, a business type of "sales" and a product identifier of "order" may be stored with the data. If, on the other hand, the data was generated by an account management department, the business type may be "account management." Additionally, data may be flagged to avoid archiving or to initiate archiving immediately. For example, data that is associated with an on-going litigation may be flagged so that it is not archived whereas expired data that is associated with a completed transaction or an expired contract or account may be flagged so that it can be archived immediately. An exemplary rule set is illustrated below.

| | Conditions | | |
|---|---|---|---|
| Business Type | Internal Customer Product Identifier | Flags | Event Triggered |
| Sales | Orders | On-going Litigation | Resubmit data in 36 months. |
| | | Completed Orders | Archive data. |
| | Contracts | On-going Litigation | Resubmit data in 24 months. |
| | | Expired Contract | Archive data. |
| Account Management | N/A | Current Account | Resubmit data in 12 months. |
| | N/A | Expired Account | Archive data. |

Various rule sets are possible. For example, a rule set may trigger storing a status, such as the closed transaction status, with a data element, rather than calculating or re-calculating a resubmission date. For some types of data elements, archiving may be triggered based on administrative data other than the resubmission date. These data elements may not have a resubmission date assigned to them.

The processes generated by archiving factory 101 may be independent of an application 106 that generates data because the archiving processes may interact with the application 106 by retrieving application-specific information from a translation record 102. The archiving factory 101 may generate transaction records 102(1)-102(B) for applications 106(1)-106(A) responsive to user input and/or information obtained from the applications 106(1)-106(A). A translation record 102 may comprise locations of tables that store data to be processed for archiving, as well as methods or commands that are in a format that is compatible with the application. These commands when processed may retrieve data from the application and delete data stored by the application. Archiving factory 101 may query the application 106 and provide a user with options to generate the translation record 102 that will provide access to the application 106 during run-time. The archiving factory 101 may store this data in memory so that it can be retrieved during the archiving process. Provided below is an exemplary record comprising the translation record 102.

| Location of Data | Archiving Mode |
| --- | --- |
| [System IP Address] x:/sys/FirstTable | Archive + Delete |
| [System IP Address] x:/sys/NextTable | Archive + Delete |
| [System IP Address] x:/sys/Last Table | Delete |
| Application Specific Methods | Description |
| Get Data | Retrieves data from a table. |
| Write Data | Writes data to a file. |
| Delete Data | Deletes data from a table. |

During run-time, the archiving engine 104 retrieves data from one or more of applications 106(1)-106(A) to begin the archiving process. To retrieve data from the application 106, the archiving engine 104 may retrieve the translation record 102 that was stored by the archiving factory 101. For example, a retrieval command such as "get data" may be retrieved from the transaction record 102. Also, names of tables storing data to be processed may be retrieved from translation record 102. The archiving engine 104 may send an application-specific query 105 that comprises the command and one or more locations of data to retrieve data for archiving.

The application 106 may respond by transmitting data to be processed 107 to the archiving engine 104. Data to be processed 107 comprises data that was stored by the application 106. According to one embodiment of the invention, a resubmission date is stored with a data object. A preliminary comparison is made of this resubmission date to determine whether the date is above a threshold and, therefore, is ready for archiving. The archiving engine 104 may select business objects that have a resubmission date that is less than or equal to the current date and a status that is equal to not archivable. In this embodiment, the data to be processed 107 may comprise only data that meets this initial criteria.

The archiving engine 104 may compare the data to be processed 107 to conditions stored in rule set 103. If a condition is met, an action may be triggered. Exemplary actions include returning data to the application 106 so that it may be stored by application 106 or archiving data. Data may be divided into two groups archivable data 109 and non-archivable data 108. Archivable data 109 may be sent to a storage location of archived data 110. An exemplary storage location is an external database. Non-archivable data may be returned to the application 106. The rule set 103 may be processed to recalculate a resubmission date for the data element. The resubmission date may be stored with the data element.

Data may also be archived if it is old or has not been used for a preset period of time. Date information stored with the data element, such as a creation date, a last used date, or other dates indicating the age or usefulness of the data element may be compared to a threshold. If, for example, a last used date is greater than a threshold, a data element may be archived if no other conditions trigger returning the data to the application.

Figure 2:
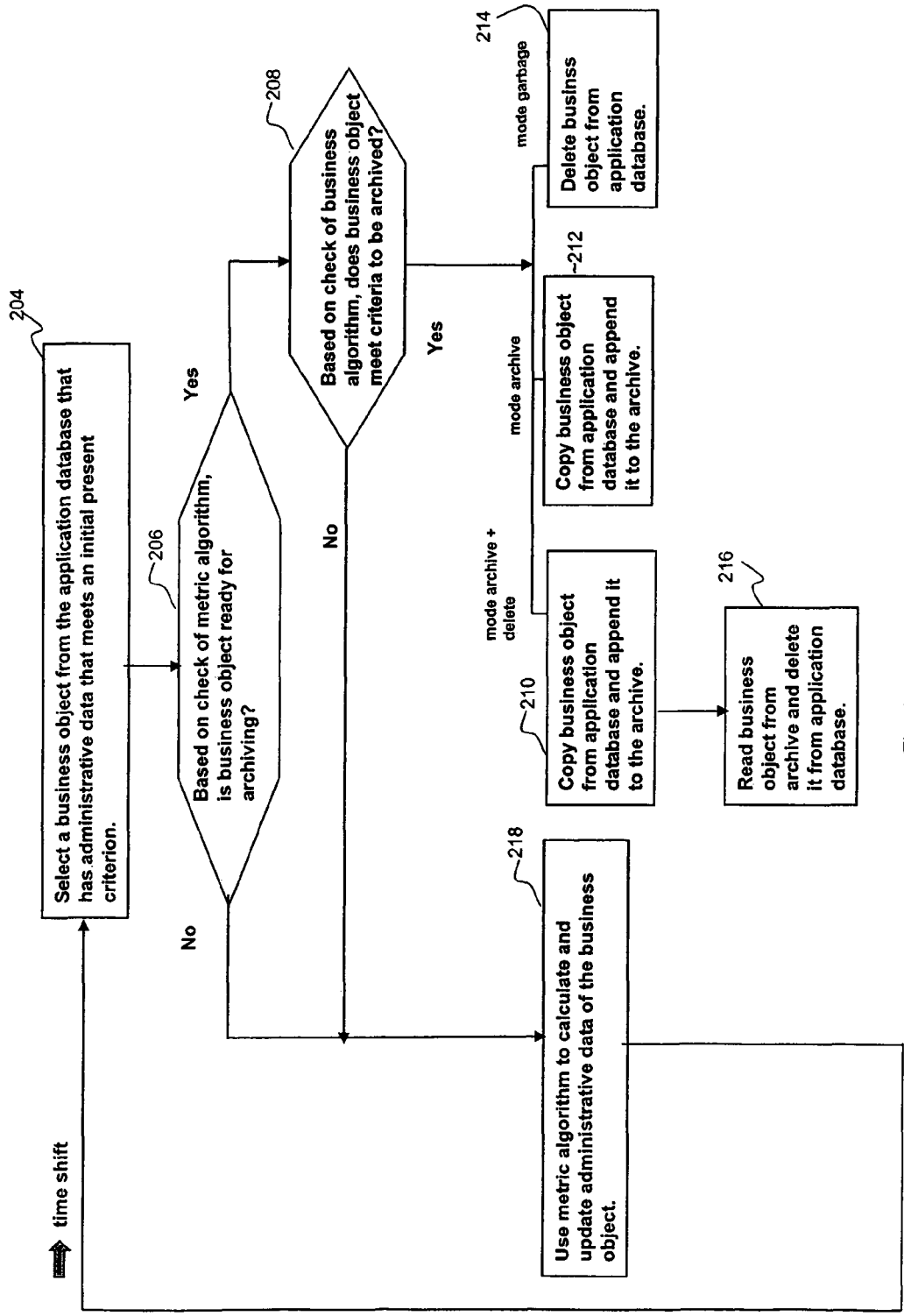
FIG. 2 illustrates an archiving scenario triggered by a scheduler according to one embodiment of the invention.

FIG. 2 depicts the operation of an archiving scenario that is triggered by a scheduler 202 according to one embodiment of the invention.

In step 204, a business object is selected from the application 106. The archiving engine 104 may select business objects that have administrative data that meets initial criteria. For example, business objects may be selected that have a resubmission date that is less than or equal to the current date and a status that is equal to not archivable. A business object may be assigned a "valid to" date of Jul. 1, 2003 and/or a status of not archivable. If this business object is checked in 2004, it would be submitted for further processing. If a business object has a resubmission date that is greater than the current date, the business object may be maintained by the application and may not be archived until a later date. For example, a business object with a "valid to" date of Jul. 1, 2005 would not be processed further if it was checked in 2004 because the valid to date is less than the current date. In an alternate embodiment of the invention, the resubmission date is compared to another threshold date or value.

In addition to comparing a resubmission date stored with the business object to the current date or some other threshold date, a lifecycle status of the business object may be compared to one or more lifecycle statuses that indicate that the business object can be considered for archiving. A lifecycle status may be administrative data that is stored with a business object to indicate the current state of the business object within its lifecycle. Exemplary lifecycle statuses are described in the table below.

| Lifecycle Status | Description |
| --- | --- |
| In operation | Data element resides in an operative application system. |
| In residence | Data element should remain in system although it is out of operation. |
| Archivable | Data element may be archived and removed from the application database. |
| Not archivable | Data element must remain in the system. Non-archivable data 108 may be assigned a lifecycle status of not archivable. |
| Archived | Data element has been archived and is out of operation. |
| Deleted | Data element is irreversibly deleted from the system. |

In one embodiment of the invention, a lifecycle status may be dependent on other lifecycle statuses. For example, a data element may progress from a lifecycle of "in operation," to "in residence," then to "not archivable," next to "archivable," and then to either "archived" or "deleted." The data representation of a data element may change during its lifecycle. An operative business object residing in an application may have a lifetime format whereas an archived object may have an end-of-life format comprising only what is needed for archiving purposes.

Processing may continue only for business objects that meet the resubmission date criteria and/or lifecycle status criteria. In an alternate embodiment of the invention, other administrative data and/or business characteristics may be compared to criteria stored as, for example, a set of rules that when met trigger archiving. Processing may continue only for business objects that meet the preset criteria.

In step 206, the archiving engine 104 checks a metric algorithm to determine if the selected business object meets additional conditions for archiving. The metric algorithm may recompute administrative data so that it reflects any changes since the business object was last checked for archiving. For example, the metric algorithm may recompute administrative data by retrieving the latest recorded use date that indicates when the data element was last used. If administrative data is modified, it may then be checked with preset criteria to determine whether the data element should be archived.

A metric algorithm may be a set of rules that defines for various business characteristics the administrative data, e.g., a resubmission date, which may also be referred to as an expiration date. Each rule may include a condition field specifying parameter data that identifies the data objects to which the respective rule applies to and expiration data. Exemplary parameter data may be business characteristics, which may be business type, internal customer product identifier, and a flag field. Expiration data may include a time period for resubmission, also referred to as an expiration distance. The time period for resubmission may be added to the latest recorded use date to obtain a new resubmission date. This may be used to ensure that the resubmission date retrieved from the business object is still accurate.

The metric algorithm may check for an exact match of the business characteristics. Processing the check of the business characteristics may be done using a layered approach. For example, if an exact match is found of one business characteristic, the metric algorithm may check the next level for another exact match. Using the exemplary metric definitions shown below, if data is within a sales company's databases is for completed orders, an exact match would be found for three levels and the resulting time period for resubmission would be "6 months." If instead the data is associated with orders related to an on-going litigation, the resulting time period for resubmission may be "36 months."

| Business Type | Internal Customer Product Identifier | Flags | Time Period for Resubmission |
| --- | --- | --- | --- |
| Sales | Orders | On-going Litigation | 36 |
|  |  | Completed Orders | 6 |
|  | Contracts |  | 24 |
| Account Management |  |  | 12 |

Other priority schemes are possible. For example, there may be no layered approach and each condition may be checked independently. Another prioritization scheme may be selected to determine which time period for resubmission should be applied if two conditions are both met, e.g., conditions may be processed in order from more specific to more general and the time period for resubmission is used of the first match that is identified. In an alternate embodiment of the invention, another field may be included that indicates priority among two matching entities.

If the time period for resubmission plus the latest recorded use date is less than or equal to the resubmission date retrieved from the business object, processing continues. However, if instead the time period for resubmission plus the latest recorded use date is greater than the resubmission date retrieved from the business object, processing may proceed to step 218 to store the recalculated resubmission date and delay archiving of the data element.

A generic metric can also be included that is used if a business object does not fit within the business characteristics. A generic metric may include a default resubmission period that is applied if the archiving engine 104 does not identify any of the business characteristics that are maintained for archiving purposes.

If based on a check of the metric algorithm and/or other administrative data, the business object is ready for archiving, processing proceeds to step 208. If on the other hand, the business object is not ready for archiving, processing proceeds to step 218.

In step 208, a business algorithm is checked to determine what mode should be used to archive data and/or whether data should be archived. Archiving of data may be dependent on the status of other data. Therefore, a business algorithm may be processed to identify dependencies prior to further processing. A dependency may exist when a business object cannot be removed from the database because it is dependent on one or more other business objects. Data may be dependent on other data for business and/or processing reasons. For example, supplier information may not be deleted from a system if there are still orders in the system relating to the supplier. A dependency may be reflected by, for example, a parent and/or child relationship between an object and other data objects that cannot be archived. Alternatively, pointers may be set to reflect dependencies among data elements or other software techniques may be implemented to reflect these dependencies. If a dependency is identified, processing may proceed to step 218 so that the data element may be rejected and returned to the application.

The archiving engine 104 may operate in various modes that allow it to handle archiving throughout its life cycle. Exemplary modes include archive+delete mode, archive mode, and garbage-collection mode. In archive+delete mode, the selected business object is archived to archive files 108 and then deleted from the application database 114. In archive mode, the selected business object is archived to archive files 108 but is not deleted from application database 114. In garbage-collection mode, data is deleted without archiving. The archiving mode may be retrieved from a table that stores application information and archiving modes that correspond to each application. In an alternate embodiment of the invention, the archiving mode is stored with the data element.

If no archiving mode is identified, the data is not ready to be archived and processing proceeds to step 218. If the mode of operation is "archive+delete," processing proceeds to step 210. If the mode of operation is "archive," processing proceeds to step 212. If the mode of operation is "garbage-collection," processing proceeds to step 214.

Steps 204, 206, and 208 reflect a tiered approach to determining whether a data element should be archived. Step 204 is the most efficient to process. Administrative data may be stored, for example, in one or more fields. These fields may be indexed and may be in the header of the data element. In step 204, the archiving engine can then easily identify just the particular field of the data element and need not retrieve the entire element. The information in these fields can be quickly compared to initial criteria. Only a subset of elements meeting this initial criteria may be further processed to determine if they should be archived. Thus, the archiving process is more efficient.

In step 206, since the administrative data in the fields is checked using, for example, other information stored by the data element, additional information may need to be retrieved. Also, computations may be done. However, since this is done on a subset of data meeting the initial criteria, the archiving process is efficient. In step 208, further information stored with the data element may be retrieved to check to determine whether, due to a dependency of the data element on another data element, the data element should be maintained by the application. However, since the subset of data that reaches step 208 may be narrowed by steps 204 and 206, the archiving process is efficient. Data elements may be retrieved via common polymorphic access methods such as analyze, write, delete, replicate and collect garbage.

Step 210 is reached when the archiving engine 104 operates in archive+delete mode. In step 210, the archiving engine 104 copies business objects from application database 114 and appends them to the archived files 108. As a result the business object is archived in archived files 108. In step 216, the archiving engine 104 reads the business object from archived files 108 and deletes it from application database 114 to reduce application database 114.

Step 212 is reached when the archiving engine 104 operates in archive mode. In step 212, the archiving engine 104 copies business objects from application database 114 and appends them to the archived files 108 to archive the business object in archived files 108. However, the business object is not deleted from application database 114.

Step 214 is reached when the archiving engine 210 operates in garbage mode. In step 214, the archiving engine 104 merely deletes business objects from application database 114. As a result, application database 114 is reduced.

In step 218, a status and reason for rejection may be determined and a resubmission date may be calculated by the metric algorithm. If the business object could not be archived, the status may be set to "not archivable." If a business object fails the criteria for archiving, a resubmission date may be determined and stored with the business object. This resubmission date may be recalculated from the latest recorded use date or from a valid to date. For example, in step 206, a resubmission date may have been recalculated using the latest recorded use date. This new resubmission date may be stored with the business object. If the business object was not identified using the business algorithm, the resubmission date may be recalculated using the prior resubmission date or other data. For example, a business object may be assigned a "valid to" date of Jul. 1, 2003. Metric definition tool may be used to set a business interval of three years, resulting in a resubmission date of Jul. 1, 2006. Application database 114 continues to maintain non-archivable business objects. After a time shift or delay, processing returns to step 204 to determine if the business objects can now be archived.

Figure 3:
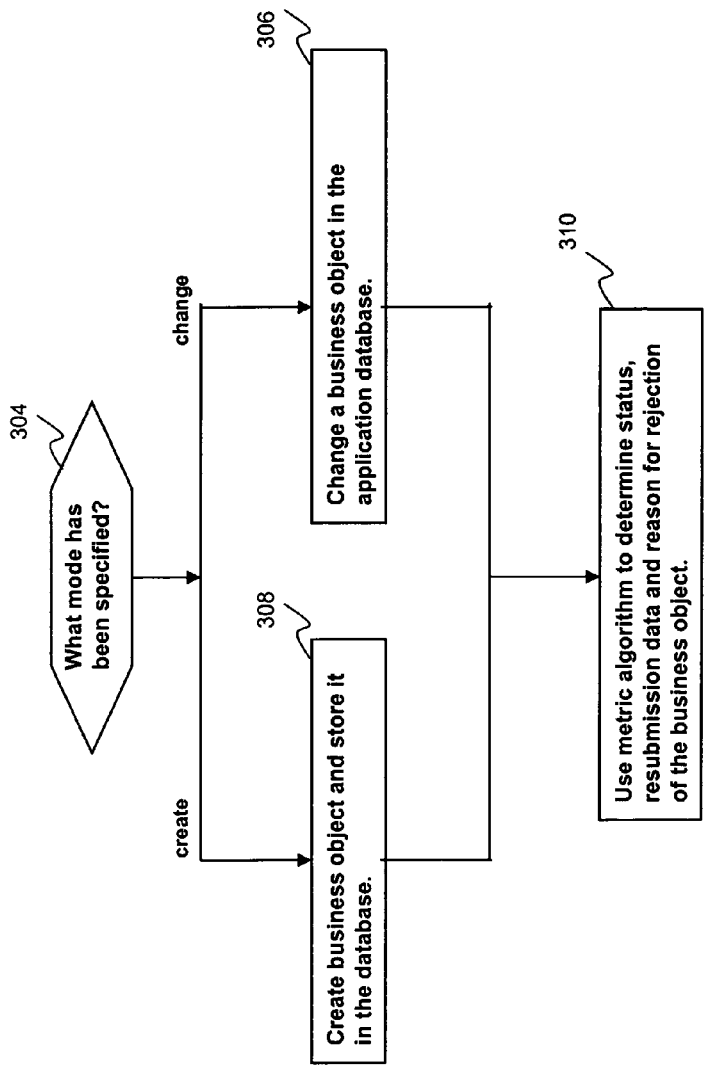
FIG. 3 illustrates an archiving scenario triggered by a business application according to one embodiment of the invention.

FIG. 3 depicts the operation of an archiving scenario that is triggered by a business application 302 according to one embodiment of the invention. The archiving scenario may update archiving administrative data assigned to the data element. Administrative data may be added or modified as a result of processing performed by the business application. In step 304, the archiving engine 104 first determines whether the mode is create or change. If the mode is create, processing proceeds to step 308. If the mode is change, processing proceeds to step 306.

In step 308, the archiving engine 104 creates administrative data and stores it with the business object in the application 106. For example, if a transaction closes, the archiving engine 104 may retrieve data associated with that transaction and add a status of "transaction closed." Administrative data may be added by processing the metric algorithm referred to in step 206 or by checking the business algorithm referred to in step 208. After step 308 has been completed, processing proceeds to step 310.

In step 306, the archiving engine 104 changes a data element that is maintained by the application 106. For example, if a an order is completed, the resubmission date of data associated with that order may be recalculated so that data is not maintained by the application 106 longer than is necessary. Administrative data may be modified by processing the metric algorithm referred to in step 206 or by checking the business algorithm referred to in step 208. After step 306 is complete, processing proceeds to step 310.

In step 310, the archiving engine 104 recalculates and updates the administrative data. For example, the archiving engine 104 may determine a status, resubmission date, and rejection reason for the business object. The archiving engine 104 may calculate a resubmission date using the metric algorithm based on the business characteristics of the business object and store the resubmission date with the business object.

Figure 4:
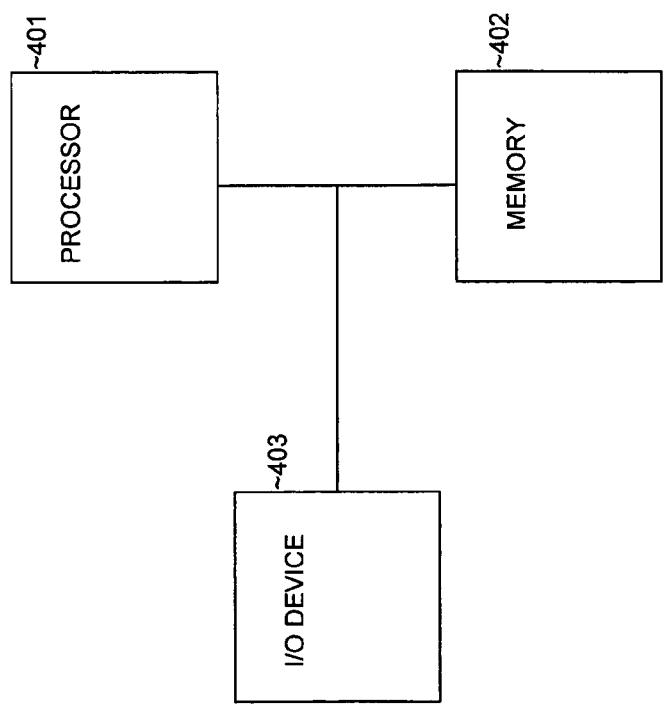
FIG. 4 shows a structure of an archiving engine according to one embodiment of the invention.

FIG. 4 shows a structure of an archiving engine 104 according to one embodiment of the invention. The archiving engine 104 includes a processor 401, memory 402, and an input/output (I/O) device 403. The processor 401 is connected to the memory 402. The processor 401 is also connected to the I/O device 403. These connections are direct or via other internal electronic circuitry or components.

The processor 401 may be a programmable processor that executes instructions residing in memory 402 to receive and send data via the I/O device 403 including a programmable microprocessor or combination of microprocessors or processors that can operate on digital data, which may be special or general purpose processors coupled to receive data and instructions from, and to transmit data and instructions to, a machine-readable medium. According to one embodiment of the present invention processor 401 is an Intel microprocessor.

Memory 402 may be a machine-readable medium that stores data that is processed by the processor 401 including a computer program product, apparatus and/or device (e.g., a random access memory (RAM), read only memory (ROM), magnetic disc, optical disc, programmable logic device (PLD), tape, or a combination of these devices). This may include external machine-readable mediums that are connected to the processor 401 via the I/O device 403.

The I/O device 403 may be a coupling that receives and/or send digital data to and from an external device.

Various implementations of the systems and techniques described here can be realized in a processing systems and/or digital electronic circuitry, integrated circuitry, specially designed ASICs (application specific integrated circuits), computer hardware, firmware, software, and/or combinations thereof.

A number of embodiments of the invention have been described. Nevertheless, it will be understood that various modifications may be made without departing from the spirit and scope of the invention.

What is claimed is:

1. A method for archiving data stored by an application database, comprising:
   comparing a current date with a resubmission date stored in association with a data element to determine whether the data element is a candidate for archiving;
   responsive to the current date matching or exceeding the resubmission date, executing an archiving policy upon the data element to further determine whether the data element is to be archived; and responsive to the further determination indicating that the data element should be archived, copying the data element to an archive, and responsive to the further determination indicating that the data element should not be archived, calculating a new resubmission date for the data element based upon results from execution of the archiving policy on the data element, the new resubmission date representing an earliest date the data element can be archived based on the archiving policy and storing the new resubmission date in association with the data element.

2. The method of claim 1, wherein the resubmission date is set based on business characteristics of the data element.

3. The method of claim 2, wherein the business characteristics include a lifecycle status that reflects the state of the data element within a lifecycle of the data element.

4. The method of claim 1, wherein the resubmission date is set by an event triggered by an application that generated or changed the data element.

5. The method of claim 1, further comprising determining whether the data element is dependent on a second data element and, if so, determining whether the second data element is archivable.

6. The method of claim 1, wherein if the data element is to be archived, deleting the data element from the application database.

7. The method of claim 1, further comprising, if the current date is not greater than the resubmission date, advance the method to a next data element without performing the archiving policy.

8. A method for archiving data stored by an application database, comprising:

comparing a resubmission date stored in association with a data element to a threshold date, to determine whether the data element is a candidate for archiving;

responsive to the resubmission date matching or exceeding the threshold date, executing an archiving policy upon the data element to further determine whether the data element is to be archived; and responsive to the further determination indicating that the data element is to be archived, copying the data element to an archive and deleting it from the application database; and responsive to the further determination indicating that the data element should not be archived, calculating a new resubmission date for the data element based upon results from execution of the archiving policy on the data element, the new resubmission date representing an earliest date the data element can be archived based on the archiving policy and storing the new resubmission date in association with the data element.

9. Computer readable medium storing thereon program instructions that, when executed, cause an executing device to:

execute instructions which examines business characteristics stored in association with a date element to determine whether the data element is a candidate for archiving;

responsive to the determination indicating that the data element is a candidate for archiving, execute an archiving policy to further determine whether the data element should be archived; and responsive to the further determination indicating that the data element should be archived, copy the data element to an archive; and responsive to the further determination indicating that the data element should not be archived, generating new business characteristics for the data element based upon the results form execution of archiving policy on the data element, the new business characteristics representing an earliest date the date element can be archived based on the archiving policy and storing the new business characteristics in association with the data element.

10. The computer readable medium of claim 9, wherein a business characteristic is a resubmission date.

11. The computer readable medium of claim 9, wherein a business characteristic also is a lifecycle status that reflects the state of the data element within a lifecycle of the data element.

12. The computer readable medium of claim 9, wherein the business characteristics are set by an event triggered by an application that generated or changed the data element.

13. Computer readable medium storing thereon program instructions that, when executed, cause an executing device to:

compare a resubmission date stored in association with a data element to a threshold date, to determine if the data element is a candidate for archiving;

responsive to the comparison indicating that the resubmission date is greater than the threshold date, executing an archiving policy upon the data element to further determine whether the data element is to be archived; and responsive to the further determination indicating that the data element is to be archived, copy the data element to an archive and delete it from the application database, and responsive to the further determination indicating that the data element should not be archived, calculating a new resubmission date for the data element based upon results from execution of the archiving policy on the data element, the new resubmission date representing an earliest date the data element can be archived based on the archiving policy and storing the new resubmission date in association with the data element.

14. A method for archiving data stored by an application database, comprising:

examining business characteristics, stored in header fields of, and associated with, a data element to determine whether the data element is a candidate for archiving;

responsive to the examination of business characteristics indicating that the data element is a candidate for archiving, executing an archiving policy upon the data element to further determine whether the data element should be archived; and responsive to the further determination indicating that the data element should be archived, copying the data element to an archive; and responsive to the further determination indicating that the data element should not be archived, generating new business characteristics for the data element based upon results from execution of the archiving policy on the data element, the new business characteristics representing an earliest date the data element can be archived base upon the archiving policy and storing the new business characteristics in association with the data element.

15. The method of claim 14, wherein the instructions are executed if a second criterion is met by business characteristic data that has been updated to reflect changes since the data element was last retrieved for archiving.

16. The method of claim 14, wherein the archiving policy is executed if the data element is not dependent on a second data element that is not archivable.

17. Computer readable medium storing thereon program instructions that, when executed, cause an executing device to:
- execute instructions to examine business characteristic data stored in header fields and associated with a data element to determine whether the data element is a candidate for archiving;
- responsive to the examination of business characteristics indicating that the data element is a candidate for archiving, execute an archiving policy upon the data element to further determine whether the data element should be archived; and
  - responsive to the further determination indicating that the data element should be archived, copy the data element to an archive; and
  - responsive to the further determination indicating that the data element should not be archived, generating new business characteristic data for the data element based upon results from execution of the archiving policy on the data element, the new business characteristic representing an earliest date the data element can be archived based on the archiving policy and storing the new business characteristic data in association with the data element.

18. The computer readable medium of claim 17, wherein the instructions are executed if a second criterion is met by business characteristic data that has been updated to reflect changes since the data element was last retrieved for archiving.

19. The computer readable medium of claim 17, wherein the archiving policy is executed if the data element is not dependent on a second data element that is not archivable.

* * * * *